United States Patent
Kalthoff et al.

(10) Patent No.: US 7,272,776 B2
(45) Date of Patent: Sep. 18, 2007

(54) MASTER DATA QUALITY

(75) Inventors: Wolfgang Kalthoff, Bad Schoenborn (DE); Frank Rohloff, Sandhausen (DE)

(73) Assignee: SAP Aktiengesellschaft, Walldorf (DE)

( * ) Notice: Subject to any disclaimer, the term of this patent is extended or adjusted under 35 U.S.C. 154(b) by 412 days.

(21) Appl. No.: 10/747,663

(22) Filed: Dec. 30, 2003

(65) Prior Publication Data

US 2005/0144552 A1    Jun. 30, 2005

(51) Int. Cl.
G11C 29/00 (2006.01)
G06F 11/00 (2006.01)

(52) U.S. Cl. .......... 714/769; 714/54
(58) Field of Classification Search .......... 714/811, 714/769
See application file for complete search history.

(56) References Cited

U.S. PATENT DOCUMENTS

| | | | |
|---|---|---|---|
| 4,459,663 A | 7/1984 | Dye | 705/29 |
| 5,099,431 A | 3/1992 | Natarajan | 700/105 |
| 5,182,705 A | 1/1993 | Barr et al. | 705/11 |
| 5,191,534 A | 3/1993 | Orr et al. | 700/105 |
| 5,311,424 A | 5/1994 | Mukherjee et al. | 705/29 |
| 5,442,782 A | 8/1995 | Malatesta et al. | 707/4 |
| 5,655,085 A | 8/1997 | Ryan et al. | 705/4 |
| 5,694,598 A | 12/1997 | Durand et al. | 707/103 R |
| 5,703,938 A | 12/1997 | Lucas et al. | 379/122.05 |
| 5,710,884 A | 1/1998 | Dedrick | 709/217 |
| 5,758,031 A * | 5/1998 | De Silva | 706/47 |
| 5,859,972 A | 1/1999 | Subramaniam et al. | 709/203 |
| 5,911,139 A | 6/1999 | Jain et al. | 707/3 |
| 6,018,742 A | 1/2000 | Herbert, III | 707/102 |
| 6,029,195 A | 2/2000 | Herz | 725/116 |
| 6,032,147 A | 2/2000 | Williams et al. | 707/101 |
| 6,067,525 A | 5/2000 | Johnson et al. | 705/10 |
| 6,226,650 B1 | 5/2001 | Mahajan et al. | 707/207 |
| 6,236,997 B1 | 5/2001 | Bodamer et al. | 707/10 |
| 6,324,647 B1 | 11/2001 | Bowman-Amuah | 726/23 |
| 6,405,132 B1 | 6/2002 | Breed et al. | 701/307 |
| 6,480,755 B1 | 11/2002 | Ootani et al. | 700/105 |
| 6,487,594 B1 | 11/2002 | Bahlmann | 709/225 |
| 6,529,948 B1 | 3/2003 | Bowman-Amuah | 709/214 |

(Continued)

FOREIGN PATENT DOCUMENTS

CA    2391829    6/2001

(Continued)

OTHER PUBLICATIONS

U.S. Appl. No. 09/577,268, filed May 2000, Hazi et al.

(Continued)

*Primary Examiner*—Shelly Chase
(74) *Attorney, Agent, or Firm*—Schwegman, Lundberg, Woessner & Kluth P.A.

(57) ABSTRACT

A method of enhancing the quality of data stored in a system includes receiving data from a first data enterer, accepting data received from the first data enterer into the system if the data are entered in a format compliant with a first set of rules, receiving first additional data from a second data enterer, the first additional data being related to the data received from the first data enterer, and accepting first additional data received from the second data enterer into the system if the data are entered in a format compliant with a second set of rules.

18 Claims, 3 Drawing Sheets

U.S. PATENT DOCUMENTS

| | | | |
|---|---|---|---|
| 6,567,818 B1 | 5/2003 | Frey et al. | 707/103 R |
| 6,668,254 B2 | 12/2003 | Matson et al. | 707/10 |
| 6,711,456 B2 | 3/2004 | Yokomori et al. | 700/169 |
| 6,718,361 B1 | 4/2004 | Basani et al. | 709/201 |
| 6,738,682 B1 | 5/2004 | Pasadyn | 700/100 |
| 6,754,666 B1 | 6/2004 | Brookler et al. | 707/102 |
| 6,757,710 B2 | 6/2004 | Reed et al. | 709/203 |
| 6,768,944 B2 | 7/2004 | Breed et al. | 701/301 |
| 6,842,881 B2 * | 1/2005 | Croke et al. | 716/1 |
| 6,857,123 B1 | 2/2005 | Nuxoll et al. | 719/316 |
| 6,879,976 B1 | 4/2005 | Brookler et al. | 707/3 |
| 6,883,136 B1 | 4/2005 | Weinberg et al. | 707/508 |
| 6,910,044 B2 | 4/2005 | Weinberg et al. | 707/1 |
| 6,895,408 B1 | 5/2005 | Kavantzas | 707/104.1 |
| 6,915,287 B1 | 7/2005 | Felsted et al. | 707/1 |
| 6,938,038 B2 | 8/2005 | Weinberg et al. | 707/4 |
| 7,013,289 B2 | 3/2006 | Horn et al. | 705/35 |
| 7,103,605 B1 | 9/2006 | Hazi et al. | 707/102 |
| 7,174,305 B2 | 2/2007 | Carruthers et al. | 705/14 |
| 2002/0116417 A1 | 8/2002 | Weinberg et al. | 707/509 |
| 2002/0161778 A1 | 10/2002 | Linstedt | |
| 2002/0184308 A1 | 12/2002 | Levy et al. | 345/703 |
| 2002/0194196 A1 | 12/2002 | Weinberg et al. | 707/100 |
| 2003/0191832 A1 | 10/2003 | Ramakrishna et al. | 709/224 |
| 2003/0233347 A1 | 12/2003 | Weinberg et al. | 707/4 |
| 2004/0015408 A1 | 1/2004 | Rauen IV et al. | 705/26 |
| 2005/0038551 A1 | 2/2005 | Mazumder et al. | 700/160 |

FOREIGN PATENT DOCUMENTS

| | | |
|---|---|---|
| DE | 10049940 A1 | 4/2002 |
| WO | WO 01/37097 | 5/2001 |
| WO | WO 02/25471 | 3/2002 |
| WO | WO 02/25500 | 3/2002 |
| WO | WO 02/47463 | 6/2002 |
| WO | WO 03/093998 A | 11/2003 |

OTHER PUBLICATIONS

Haerder T. et al., "Intergritaetskontrolle," Datenbanken Konzepte und Techniken Der Implementierung, 1999, pp. 397-405, XP002294581 [translation provided].

Haerder T. et al., "RX-Sperrverfahren," Datenbanken Konzepte und Techniken Der Implementierung, 1999, pp. 419-420, XP002294552 [translation provided].

Chaudhuri, Surajit, et al., "An Overview of Data Warehousing and OLAP Technology," SIGMOD Record, New York, NY, USA, vol. 26, No. 1, Mar. 1997, pp. 65-74, XP002193792, ISSN: 0163-5808.

Rahm, Erhard, et al., "Data Cleaning: Problems and Current Approaches," IEEE Bulletin of the Technical Committee on Data Engineering, vol. 23, No. 4, retrieved from the Internet Dec. 2000 at http://lips.informatik.uni-leipzig.de:80/pub/2000-45, XP002284896, 11 pgs.

"SyncML Protocol, version 1.0," Internet Citation, Dec. 7, 2000, XP002217356, 60 pgs.

Chan and Suwanda, "Designing Multinational Online Stores: Challenges, Implementation Techniques and Experience", *IBM Centre for Advanced Studies Conference: Proceedings of the 2000 conference of the Centre for Advanced Studies on Collaborative research*, Mississauga, Ontario, Canada, 2000, pp. 1-14.

Sheth and Larson, "Federated Database Systems for Managing Distributed, Heterogeneous, and Antonomous Databases", *ACM Computing Surveys*, 1990, 22(3): 184-236.

Berndtsson et al., Task Sharing Among Agents Using Reactive Rules, Cooperative Operation Systems, 1997. COOPIS '97., Proceedings of the Second IFCIS International, Jun. 24-27, 1997, pp. 56-65.

Hill et al., "Data Transformation: Key to Information Sharing" Gartner Group Strategic Analysis Report, Sep. 29, 1998, pp. 1-60.

Bertino, Elisa, et al., "Data Security," Proceedings of the Twenty-Second Annual International Computer Software and Applications Conference, Vienna, Austria, Aug. 19-21, 1998, Los Alamitos, CA, USA, Aug. 19, 1998, (CompSAC '98), XP010305455, pp. 228-237.

Bon, M., et al., "Sharing Product Data Among Heterogeneous Workflow Environments," CAD 2002: Corporate Engineering Research, Geman Informatics Society, Mar. 4-5, 2002, Dresden, Germany, XP002268575, pp. 1-10.

Chandramouli, Ramaswamy, "Application of XML Tools for Enterprise-Wide RBAC Implementation Tasks," Proceedings of the 5th ACM Workshop on Role-Based Access Control, Berlin, Germany, Jul. 26-27, 2000, XP000958089, pp. 11-18.

Choi, Jin Oh, et al., "Update Propagation of Replicated Data in Distributed Spatial Databases," Proceedings of Database and Expert Systems Applications: Tenth International Conference, Florence, Italy, Aug. 30, 1999-Sep. 2, 1999, DEXA '99 (Lecture Notes in Computer Science vol. 1677), Berlin, Germany, Springer-Verlag, Germany, XP009022583, pp. 952-963.

Chou, H-T. et al., "Versions and Change Notification in an Object-Oriented Database System", Proceedings of the Design Automation Conference, Anaheim, Jun. 12-15, 1988, Proceedings of the Design Automation Conference (DAC), New York, IEEE, US, vol. CONF. 25, Jun. 12, 1988, pp. 275-281, XP010013006, ISBN: 0-8186-0864-1.

Ferreira Rezende, Fernando de, et al., "A Lock Method for KBMSs Using Abstraction Relationships' Semantics," Proceedings of the International Conference on Information and Knowledge Management, CIKM, ACM, New York, NY, USA, 1994, XP002943684, pp. 112-121.

Hong, B. et al., "Modeling of Version Relationships for CAD Databases", Computers and Communications Technology Toward 2000, Seoul, Aug. 25-28, 1987, Proceedings of the Region 10 Conference, (TENCON), New York, IEEE, US, vol. 1, Conf. 3, Aug. 25, 1987, pp. 142-146, XP000011783.

Kamita, T. et al., "A Database Architecture and Version Control for Group Work", System Sciences, 1994, vol. III: Information Systems: Decision Support and Knowledge-Based Systems, Proceedings of the Twenty-Seventh Hawaii International Conference of Wailea, HI, US, Jan. 4-7, 1994, Los Alamitos, CA, US, IEEE Comput. Soc., Jan. 4, 1994, pp. 438-447, XP010097053, ISBN: 0-8186-5070-2.

Rana, S.P. et al., "Version Support for Manufacturing Database Systems", International Conference on Industrial & Engineering Applications of Artificial Intelligence & Expert Systems, Tullahoma, IN, US, New York, NY, US, vol. 2, Jun. 6, 1989, pp. 779-784, XP000605772.

Anonymous. "Data Profiling the Foundation for Data Management," Dataflux Corp., Jul. 1, 2004, pp. 1-17, XP002313258.

Garcia, M.S., et al. "Immunization Registries DeDupliation and Record Matching," White Paper, 1999, XP002259647, 11 pgs.

Georgakopoulos, D., et al. "An Overview of Workflow Management: From Process Modeling to Workflow Automation Infrastructure," Distributed and Parallel Databases, Kluwer, NL, vol. 3, No. 2, Apr. 1995, pp. 119-153, XP001055255.

Haerder T. et al., "Integritaetskontrolle," Datenbanken Konzepte und Techniken Der Implementierung, 1999, pp. 397-405, XP002294581 [translation provided].

\* cited by examiner

MASTER DATA QUALITY

TECHNICAL FIELD

This invention relates to data management and more particularly to ensuring master data quality.

BACKGROUND

Information technology ("IT") environments can consist of many different systems performing processes, such as business processes, on common data. The different systems can be part of the same entity or can be part of different entities, such as vendors or contractors. The data used for the processes can be stored in a number of different locations, systems, and/or formats. Different plants and branch offices of a company can work largely independently from each other and can store data in different formats; adopted companies can introduce new software solutions to a group of affiliated companies that require that data be stored in different formats; and systems from different vendors can be linked, but each vendor may specify that data be stored in different formats. Different data models can make it difficult to integrate business processes in these scenarios.

Thus, the format in which data are entered into an IT environment depends strongly on the underlying data model used for storing the data in a particular location. For example, measurement data may be stored in English units at one plant but in metric units in another plant, or sales data may be stored in terms of revenue per month for one regional sales department, but in terms of revenue per week in another regional sales department. Because the format in which data are entered depends on the underlying data storage model, the user must recognize the underlying data model of the particular data storage system and must conform the format in which data are entered to the underlying data model. Furthermore, the user must ensure when data are entered into the system the data meet certain consistency checks that are imposed by the underlying data model. The data are not accepted until the consistency checks are satisfied.

SUMMARY

In a first general aspect, a method of enhancing the quality of data stored in a system includes receiving data from a first data enterer, accepting data received from the first data enterer into the system if the data are entered in a format compliant with a first set of rules, receiving first additional data from a second data enterer, the first additional data being related to the data received from the first data enterer, and accepting first additional data received from the second data enterer into the system if the data are entered in a format compliant with a second set of rules.

In a second general aspect, a computer program product, tangibly stored on a machine readable medium, for enhancing the quality of data stored in a system, includes instructions for causing a processor to receive data from a first data enterer, accept data received from the first data enterer into the system if the data are entered in a format compliant with a first set of rules, receive first additional data from a second data enterer, the first additional data being related to the data received from the first data enterer, and accept first additional data received from the second data enterer into the system if the data are entered in a format compliant with a second set of rules.

One or more of the following features can be included. For example, to comply with the second set of rules, the data must also comply with the first set of rules. Data accepted into the system can be compared with a third set of rules, an inconsistency in data entered into the system with a rule from the third set of rules can be detected, a report of the inconsistency can be dispatched to an error corrector, and corrected data can be received from the error corrector. To comply with the third set of rules, the data may be required also to comply with the second set of rules. The data received from the first and second data enterers and entered into the system for use by a user of the system can be released before the corrected data are received from the error corrector. It can be required that the inconsistency be corrected by the error corrector within a particular timeframe, and the error corrector can be reminded to correct the data before the end of the timeframe. A particular error can be dispatched to a particular error corrector for correction. The load of errors assigned to an error corrector can be monitored, and an additional report of inconsistency can be dispatched to another error corrector when the load of errors assigned to the error corrector exceeds a threshold load.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
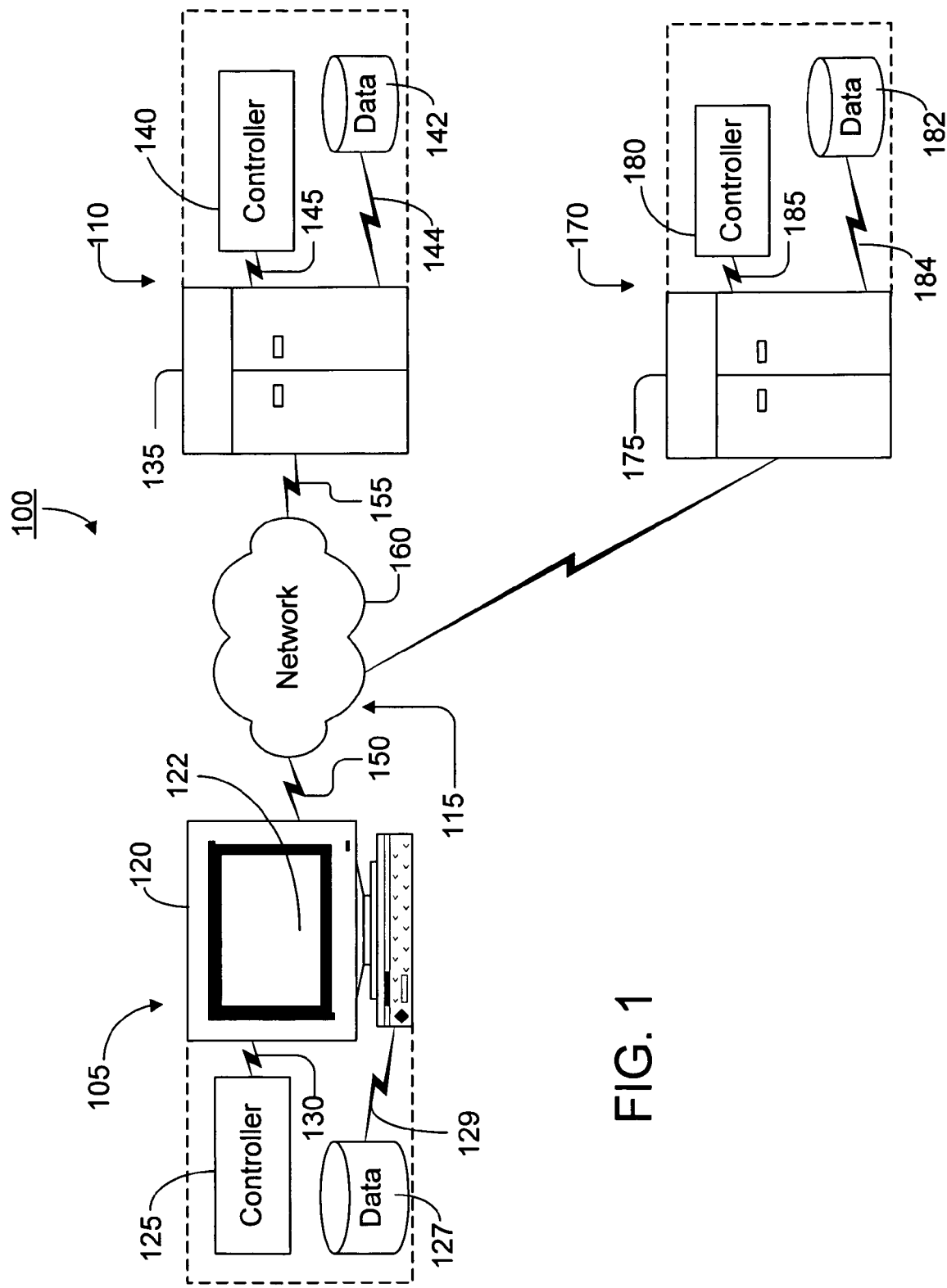
FIG. 1 is a schematic diagram of a system for entering and storing data.

For illustrative purposes, FIG. 1 describes a communications system for implementing techniques for entering and storing data. For brevity, several elements in the figures described below are represented as monolithic entities. However, as would be understood by one skilled in the art, these elements each may include numerous interconnected computers and components designed to perform a set of specified operations and/or dedicated to a particular geographical region.

Referring to FIG. 1, a data entry and storage system 100 is capable of receiving data at a data entry system 105 and a storing data in the data entry system 105 or transferring the data through a communications link 115 to one or more data storage systems 110, 170 for storage. Data entry and storage system 100 may exist within an organization and may include components remotely located from each other and/or components that are used by different users within the organization. The data entry system 105 typically includes one or more data entry devices 120, which include a user interface 122, and/or data entry controllers 125, and/or data storage devices 127. For example, the data entry system 105 may include one or more general-purpose computers (e.g., personal computers), one or more special-purpose computers (e.g., devices specifically programmed to communicate with each other and/or the data storage system 110), or a combination of one or more general-purpose computers and one or more special-purpose computers. The data entry system 105 may be arranged to operate within or in concert with one or more other systems, such as for example, one or more LANs ("Local Area Networks") and/or one or more WANs ("Wide Area Networks").

The data entry device 120 is generally capable of executing instructions under the command of a data entry controller 125. The data entry device 120 is connected to the data entry controller 125 by a wired or wireless data pathway 130 capable of transferring information.

The data entry device 120, data entry controller 125, and data storage device each typically includes one or more hardware components and/or software components. An example of a data entry device 120 is a general-purpose computer (e.g., a personal computer), which may receive data through a user interface 122 and which is capable of responding to and executing instructions in a defined manner. Other examples include special-purpose computer, a workstation, a server, a hand-held computer, a mobile telephone, a personal digital assistant ("PDA"), a device, a component, other equipment or some combination thereof capable of responding to and executing instructions. An example of data entry controller 125 is a software application loaded on the data entry device 120 for commanding and directing the input of data enabled by the data entry device 120. Other examples include a program, a piece of code, an instruction, a device, a computer, a computer system, or a combination thereof, for independently or collectively instructing the data entry device 120 to interact and operate as described herein. The data entry controller 125 may be embodied permanently or temporarily in any type of machine, component, equipment, storage medium, or propagated signal capable of providing instructions to the data entry device 120. An example of data storage device 127 is a magnetic media disk for storing data and coupled to data entry device 120 by a communication link 129. Data entry device may run database software for managing and organizing the storage of data on data storage device 127 in a data model that is understandable to a user, and the database software may present the data stored on the data storage device 127 to the user within the context of the data model.

The communications link 115 typically includes a delivery network 160 making a direct or indirect communication between the data entry system 105 and the data storage system 110, irrespective of physical separation. Examples of a delivery network 160 include the Internet, the World Wide Web, WANs, LANs, analog or digital wired and wireless telephone networks (e.g., PSTN, ISDN, or xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable, or satellite communication pathway.

The first data storage system 110 typically includes one or more data storage devices 135 capable of executing instructions under the command and direction of a data storage controller 140. The data storage device 135 is connected to the data storage controller 140 by a wired or wireless data pathway 145 capable of carrying and delivering data and/or data storage controllers 140. For example, the first data storage system 110 may include one or more general-purpose computers (e.g., personal computers), one or more special-purpose computers (e.g., devices specifically programmed to communicate with each other and/or the data entry system 105), or a combination of one or more general-purpose computers and one or more special-purpose computers. The data storage system 110 may be arranged to operate within or in concert with one or more other systems, such as, for example, one or more LANs ("Local Area Networks") and/or one or more WANs ("Wide Area Networks").

The data storage device 135 and data storage controller 140 each typically includes one or more hardware components and/or software components. An example of a data storage device 135 is a general-purpose computer (e.g., a personal computer) coupled to a data storage medium 142 through a communications link 144 and capable of responding to and executing instructions in a defined manner. Other examples include a special-purpose computer, a workstation, a server, a device, a component, other equipment or some combination thereof capable of responding to and executing instructions. An example of data storage controller 140 is a software application (e.g., a database application) loaded on the data storage device 135 for commanding and directing the storage and presentation of data stored on the data storage device 135 in a data model that is understandable to a user. The software application may present the data stored on the data storage device 135 to the user within the context of the data model. Other examples include a program, a piece of code, an instruction, a device, a computer, a computer system, or a combination thereof, for independently or collectively instructing the data storage device 135 to interact and operate as described herein. The data storage controller 140 may be embodied permanently or temporarily in any type of machine, component, equipment, storage medium, or propagated signal capable of providing instructions to the data storage device 135.

The second data storage system 170 typically includes one or more data storage devices 175 capable of executing instructions under the command and direction of a data storage controller 180. The data storage device 175 is connected to the data storage controller 180 by a wired or wireless data pathway 185 capable of carrying and delivering data. For example, the second data storage system 170 may include one or more general-purpose computers (e.g., personal computers), one or more special-purpose computers (e.g., devices specifically programmed to communicate with each other and/or the data entry system 105), or a combination of one or more general-purpose computers and one or more special-purpose computers. The second data storage system 170 may be arranged to operate within or in concert with one or more other systems, such as, for example, one or more LANs ("Local Area Networks") and/or one or more WANs ("Wide Area Networks").

The data storage device 175 and data storage controller 180 each typically includes one or more hardware components and/or software components. An example of a data storage device 175 is a general-purpose computer (e.g., a personal computer) coupled to a data storage medium 182 through a communications link 184 and capable of responding to and executing instructions in a defined manner. Other examples include a special-purpose computer, a workstation, a server, a device, a component, other equipment or some combination thereof capable of responding to and executing instructions. An example of data storage controller 180 is a software application (e.g., a database application) loaded on the data storage device 175 for commanding and directing the storage and presentation of data stored on the data storage device 175 in a data model that is understandable to a user. The software application may present the data stored on the data storage device 175 to the user within the context of the data model. Other examples include a program, a piece of code, an instruction, a device, a computer, a computer system, or a combination thereof, for independently or collectively instructing the data storage device 175 to interact and operate as described herein. The data storage controller 180 may be embodied permanently or temporarily in any type of machine, component, equipment, storage medium, or propagated signal capable of providing instructions to the data storage device 175.

Data are stored in storage devices 127, 142, 182 using a data model for characterizing and organizing the stored data. For example, a data model of a customer sales database may include data records that include customer names, billing address, delivery address, telephone numbers, Dun & Bradstreet numbers, sales revenue generated on a monthly basis, and/or most frequently purchased items. Generally, the data model is chosen to optimize the utility of the stored data for a program that accesses the stored data. For example, the shipping department of a company may require information about the customer's shipping address but may not need information about the customer's Dun & Bradstreet number or billing address. However, the accounting department of the company may require the latter information but not the former. Additionally, the data may be stored in different formats depending on the data model in which the data are stored. For example, sales revenue data for an international organization may be stored in terms of local currency for purposes of regional salespersons but in terms of the currency used by the corporate headquarters for purposes of annual accounting, and English or metric measurement units may be used for dimensional data of a product depending on whether the data are being used by an American branch or by an international branch of the organization. However, it is cumbersome and inefficient for the person entering the data to conform to the underlying data model when entering data. The underlying data model can be flexible enough to accept data in a multitude of different formats that are compatible with different programs that can access the data. However, a flexible data model can be overly complex and confusing to the person entering the data. It is less cumbersome and more efficient for the user entering the data to input the data using a single data model.

Figure 2:
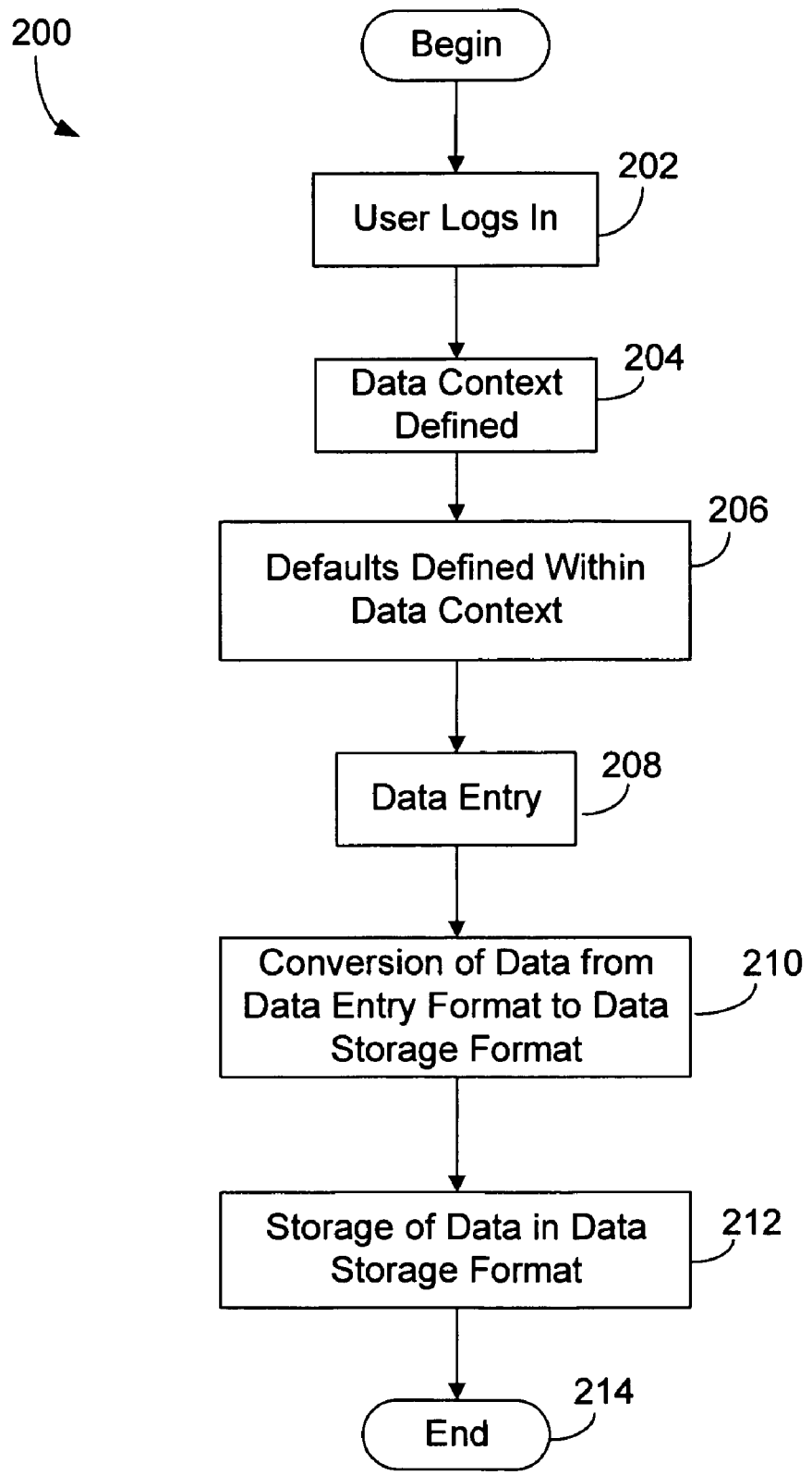
FIG. 2 is a flow chart of a process for entering and storing data.

Thus, as illustrated in FIG. 2, a process 200 can be run for converting data from a data entry data model that is generally user-friendly for the person entering the data to a data storage model that is generally process-friendly for a program accessing and using the stored data.

The process begins (step 202), and the data entry user logs into the data entry system 105 (step 204). The login process can identify the user and/or the user's role or position with the organization. For example, the login process can identify the user as a native French speaking salesperson, who uses the metric system, and who enters his sales revenue information on a weekly basis.

After the user logs in and is identified by the system (step 204), the data entry system can present a user-dependent data entry context to the user (step 206). The data can be displayed through a user interface to the data entry system. The data entry context provides certain user-specific default information to the user entering data (step 208). This user-specific information can be information pertaining to the user's organization and/or the user's function within the organization. For example, basis based on the identity of the user, the system can automatically present a user interface to the user in which instructions are presented in French, measurement data are entered in metric units, and sale revenue data are entered on a weekly. As another example, the system can determine, based on the identity of the user (e.g., a product designer), that the user always enters data that will be used by a particular department within the organization (e.g., a plant that produces products with automatic, robotic processes), and therefore the system can present a user-specific context for the user to enter data in a format that is most useful to people who will use the entered data (e.g., the production team that will be programming the robots). For example, the product designer can be presented with a user interface that requests data about the product that can be used to program the robots to produce the product. However, if the product designer knows that his product will be produced at a different plant that requires more manual labor and less robotic labor, the product designer can override the defaults and enter data in a format that is most useful to people at the different plant who will produce the product.

Thus, a user-specific data context is defined for the user entering data into the data entry system 105. The data context is not binding on the user, and the user can change the data context before entering data into the data system 105 or before passing the data to a data storage device 127, 135, 170. However, the user-specific data context is used to enhance the efficiency of data entry by setting default values that are correct for the user most of the time, although they can be altered by the user when necessary.

After the user-specific data context is defined and the user interface is presented to the user, the user enters data into the data entry system 105 through the user interface 122 (step 210). The user enters the data in a data entry data model.

When the data entered by the user are to be stored and/or later accessed in a format or data model that is different from the data entry data model, the data received by the data entry system 105 are converted from the data entry data model into a data storage data model (step 212). For example, the data model used for storing the data can require that the data be stored in English rather than French, that English rather than metric measurement units be used, and that sales revenue data be stored in terms of sales per month rather than sales per week. The data entry system 105 or one of the data storage systems 135, 170 performs this transformation on the data entered in the data entry data model before storing the data or before delivering the data to a user accessing the stored data.

Data can also be generated based on the data received in the data entry data model. For example, when information about a customer's name and address are entered in the data entry data model, a Dun & Bradstreet number for the customer can be derived and entered in the data storage data model of the data that will be used by the accounting department. Also for example, the plant in which a product is to be produced may be derivable from the data entered in the data entry data model, and the data can be converted from the data entry data model to a data storage model that is most useful for the production engineers at the plant where the product will be produced. Thus, the system may derive the plant in which the product will be produced, and the user need not enter this information.

The system may transform the inputted data from the data entry model into more than one data storage model when the data will be accessed in the form of more than one data storage model. For example, a company may have several production plants, each of which has its own data storage model. Thus, the system may receive the inputted data and transform the data into more than one data storage model for use by users at the different plants.

After the data are transformed into the appropriate data storage model, the data are stored (step 214) in a data storage device 127, 135, 175 for later access, and the process ends (step 216).

Figure 3:
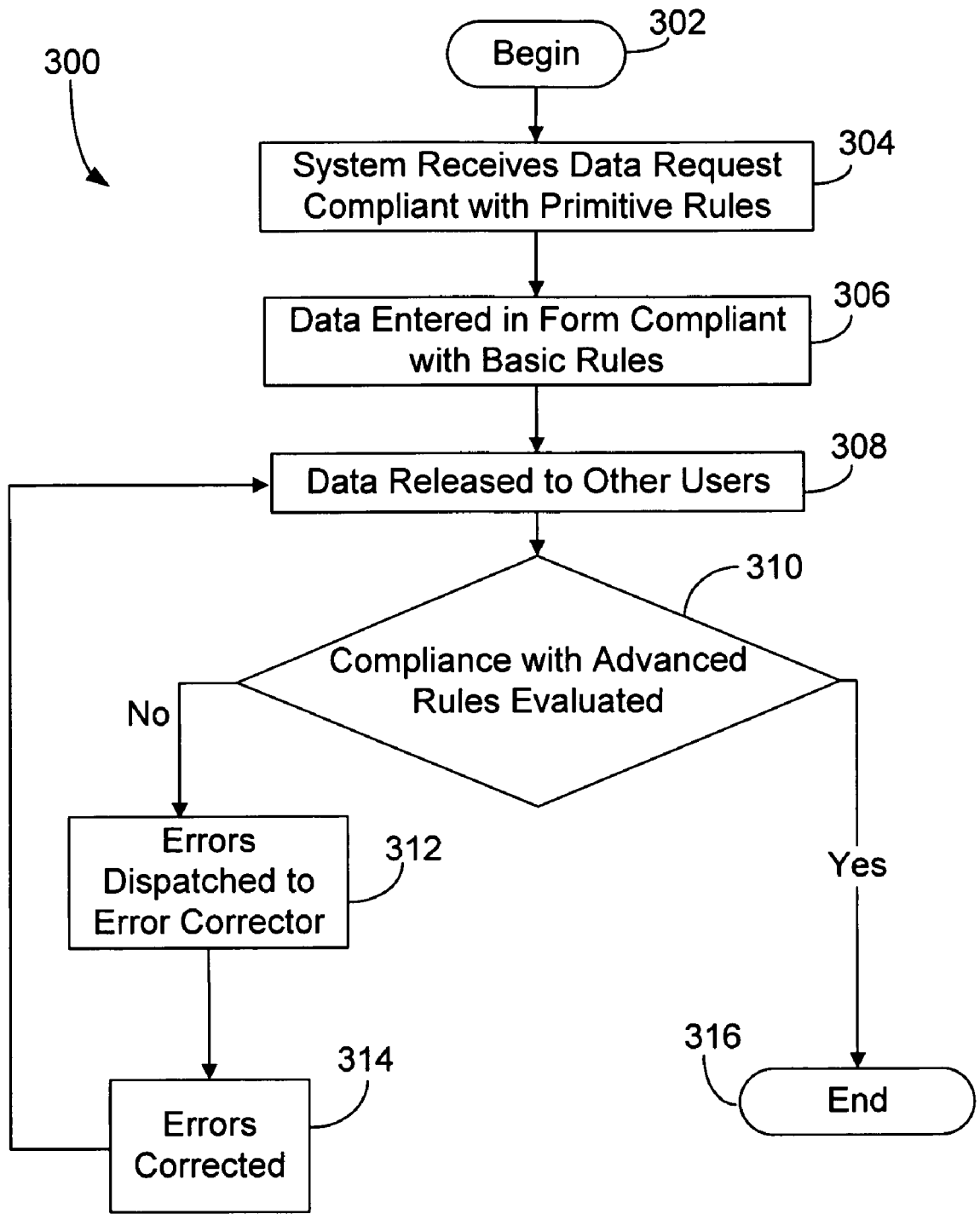
FIG. 3 is a flow chart of a process for ensuring data quality.

Referring to FIG. 3, the above-described process is related to a process 300 for ensuring the quality of data entered into the system. The process begins (step 302) and a data request is submitted by a person requesting data, and the request is received by the system (step 304). This request provides a seed of data into the system that can grow and become more formalized through additional data entry during later steps. For example, the data requestor may be a sales manager who specifies what data must be entered by sales representatives into the system. In general, this person has some information about the rules that will apply to the requested data, but the person does not necessarily know all the details of the applicable rules. The system can require a certain level of data consistency from the data requester (e.g., the data requester cannot ask for a product's color to be entered when the product has only one color). Nevertheless, the data quality of the requested data entered by the data requester will generally be low, and the requester is not forced to abide by all rules that are applicable to the data when entering the data. He might be required to abide by some rules when making a request for data (e.g., when requesting sales revenue data, he may be required to also request the name of the customer who is responsible for the sales revenue), however, his non-adherence to other rules may be presented to him as warnings that he may correct at the moment or at a later time (e.g., if the data requester requests that a customer's telephone number be entered, he may be warned or prompted also to request the customer's address, but he is not required to request the address at this time).

After a data request has been formulated based on input from the data requestor, a data entry specialist enhances the data based on the data request (step 306). The data entry specialist takes over the data entry task from the data requestor and corrects the data requested to improve the quality of the data. For the data entry specialist, all basic rules are active, and he cannot release data until the data abide by all basic rules. However, he can save data that are inconsistent to give him time to collect information to abide by all rules. For example, he can save customer sales revenue data that do not contain a customer's address, but before releasing the data to other users he may be required to enter the customer's address. After data abide by all basic rules, the data are released for use by other users (step 308).

However, even after data are released and they can be used by other users, they are not necessarily of sufficient quality for all purposes. A refinement of the data may be necessary because further criteria may often need to be met, and it may be necessary for the data to comply with advanced rules. Whenever data are changed or entered in the system an advanced rules engine is triggered to evaluate compliance with the advanced rules and determine if any inconsistencies exist in the data (step 310). The advanced rules may have a long run time and may not be executable in real time. If no errors are found, the process 300 ends (step 316). When errors are found, the errors are dispatched to a corresponding error corrector (step 312), who can review the afflicted data object and a description of the error. The assignment of an error to an error corrector can be performed in a hierarchical manner. Initially, the correction of each different error can be assigned to a different error corrector. However, if the workload of responding to a particular error (e.g., type A errors) becomes too great, then all type A errors for a particular product type (e.g., product α) may be sent to error corrector 1 for correction, while all type A errors for a different product type (e.g., product β) can be sent to error corrector 2 for correction. In this way, a general assignment of rare errors is performed, while a detailed assignment of common errors is performed with a minimum of customization. By dividing the data entry process among the data requester, the data entry specialist, and the data corrector, data grow slowly and become more formalized during several steps.

After an error has been assigned and dispatched to an error corrector, the error corrector is allowed a certain amount of time to correct the error. For each error a timeframe is defined in which the error must be resolved. For example, an error reporting that a customer's name is missing from a data entry might have to be resolved within a week, while an error reporting a missing Dun & Bradstreet number for the customer might be less important to the company compiling the data and two months may be allowed for this error to be resolved. After errors are corrected (step 314) the corrected data are released to other users (step 308) and compliance with advances rules is evaluated again.

The system monitors the correction of errors and sends reminders to the assigned error correctors that the errors must be corrected within their specified timeframes. The system therefore ensures that errors are caught and resolved. Also, the system can determine automatically when an error corrector's workload becomes too high and begins shifting errors to other error correctors to be resolved. Thus, the resources of the error correctors can be used most efficiently.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. Accordingly, other embodiments are within the scope of the following claims.

What is claimed is:

1. A method of enhancing quality of data stored in a system, the method comprising:
   receiving data from a first data enterer;
   accepting data received from the first data enterer into the system if the data are entered in a format compliant with a first set of rules;
   receiving first additional data from a second data enterer, the first additional data being related to the data received from the first data enterer;
   accepting first additional data received from the second data enterer into the system if the data is entered in a format compliant with a second set of rules;
   comparing data accepted into the system with a third set of rules;
   detecting an inconsistency in data accepted into the system with a rule from the third set of rules;
   dispatching a report of the inconsistency to an error corrector; and
   receiving corrected data from the error corrector.

2. The method of claim 1, wherein, to comply with the second set of rules, the data must also comply with the first set of rules.

3. The method of claim 1, wherein, to comply with the third set of rules, the data must also comply with the second set of rules.

4. The method of claim 1, further comprising releasing the data received from the first and second data enterers and entered into the system, the releasing being performed before the corrected data is received from the error corrector.

5. The method of claim 1, further comprising requiring that the inconsistency be corrected by the error corrector within a particular timeframe.

6. The method of claim 5, further comprising reminding the error corrector to correct the data before the end of the timeframe.

7. The method of claim 1, further comprising:
   dispatching a particular error to a particular error corrector for correction.

8. The method of claim 7, further comprising:
   monitoring a load of errors assigned to an error corrector; and
   dispatching an additional report of inconsistency to another error corrector when the load of errors assigned to the error corrector exceeds a threshold load.

9. A computer program product, tangibly stored on a machine readable medium, for enhancing a quality of data stored in a system, the computer program product comprising instructions for causing a processor to:
   receive data from a first data enterer;
   accept data received from the first data enterer into the system if the data are entered in a format compliant with a first set of rules;
   receive first additional data from a second data enterer, the first additional data being related to the data received from the first data enterer;
   accept first additional data received from the second data enterer into the system if the data is entered in a format compliant with a second set of rules;
   compare data accepted into the system with a third set of rules;
   detect an inconsistency in data accepted into the system with a rule from the third set of rules;
   dispatch a report of the inconsistency to an error corrector; and
   receive corrected data from the error corrector.

10. The computer program product of claim 9, wherein, to comply with the second set of rules, the data must also comply with the first set of rules.

11. The computer program product of claim 9, wherein, to comply with the third set of rules, the data must also comply with the second set of rules.

12. The computer program product of claim 9, wherein the computer program product further comprises instructions for causing a processor to release the data received from the first and second data enterers and entered into the system, the releasing being performed before the corrected data is received from the error corrector.

13. The computer program product of claim 9, wherein the computer program product further comprises instructions for causing a processor to require that the inconsistency be corrected by the error corrector within a particular timeframe.

14. The computer program product of claim 13, wherein the computer program product further comprises instructions for causing a processor to remind the error corrector to correct the data before the end of the timeframe.

15. The computer program product of claim 9, wherein the computer program product further comprises instructions for causing a processor to dispatch a particular error to a particular error corrector for correction.

16. The computer program product of claim 15, wherein the computer program product further comprises instructions for causing a processor to:
   monitor a load of errors assigned to an error corrector; and
   dispatch an additional report of inconsistency to another error corrector when the load of errors assigned to the error corrector exceeds a threshold load.

17. A system for enhancing a quality of data stored in a system, the system comprising:
   a data storage system;
   a controller communicably coupled to the data storage system, the controller configured to:
   receive data from first data entry device;
   accept the data received from the first data entry device for storage in the data storage system if the data is entered in a format compliant with a first set of rules;
   receive first additional data from a second data entry device, the first additional data being related to the data recieved from the first data enterer;
   accept first additional data recieved from the second data entry device for storage in the data storage system if the data are entered in a format compliant with a second set of rules;
   compare the accepted data with a third set of rules;
   detect an inconsistency in data stored in the data storage system with a rule from the third set of rules;
   dispatch a report of the inconsistency to an error corrector; and
   receive corrected data from the error corrector.

18. The system of claim 17, further comprising one or more networks coupled to the data storage system and to the controller.

* * * * *

UNITED STATES PATENT AND TRADEMARK OFFICE
CERTIFICATE OF CORRECTION

PATENT NO. : 7,272,776 B2  Page 1 of 1
APPLICATION NO. : 10/747663
DATED : September 18, 2007
INVENTOR(S) : Kalthoff et al.

It is certified that error appears in the above-identified patent and that said Letters Patent is hereby corrected as shown below:

On the Title Page Item (56), under "U.S. Patent Documents", line 9, after "Lucas et al." delete "379/122.05" and insert -- 379/112.05 --, therefor.

On the Title Page On page 2, Item (56), under "Other Publications", line 1, delete ""Intergritaetskontrolle,"" and insert -- "Integritaetskontrolle," --, therefor.

On the Title Page On page 2, Item (56), under "Other Publications", line 9, delete "Geman" and insert -- German --, therefor.

On the Title Page On page 2, Item (56), under "Other Publications", line 40, after "Conference" delete "of" and insert -- on --, therefor.

On the Title Page On page 2, Item 56, under "Other Publications", lines 57-59, below "2, Apr. 1995, pp. 119-153, XP001055255." delete "Haerder T. et al., "Integritaetskontrolle," Datenbanken Konzepte und Techniken Der Implementierung, 1999, pp. 397-405, XP002294581.".

In column 3, line 17, after "include" insert -- a --.

In column 11, line 17, in Claim 17, before "first" insert -- a --.

In column 12, line 3, in Claim 17, delete "recieved" and insert -- received --, therefor.

In column 12, line 4, in Claim 17, delete "recieved" and insert -- received --, therefor.

Signed and Sealed this

First Day of January, 2008

JON W. DUDAS
*Director of the United States Patent and Trademark Office*